US011485036B1

(12) United States Patent
Chang (10) Patent No.: US 11,485,036 B1
(45) Date of Patent: Nov. 1, 2022

(54) EDGE TRIMMING MECHANISM OF EDGE BANDING MACHINE CAPABLE OF REMOVING SCRAPS AND EDGE BANDING MACHINE (71) Applicant: OAV EQUIPMENT AND TOOLS, INC., Taichung (TW)

(72) Inventor: Yen-Tsung Chang, Taichung (TW)

(73) Assignee: OAV EQUIPMENT AND TOOLS, INC., Taichung (TW)

( * ) Notice: Subject to any disclaimer, the term of this patent is extended or adjusted under 35 U.S.C. 154(b) by 0 days.

(21) Appl. No.: 17/330,623

(22) Filed: May 26, 2021

(51) Int. Cl.
B23D 59/00 (2006.01)
B26D 7/06 (2006.01)
B26D 7/18 (2006.01)
B26D 1/14 (2006.01)

(52) U.S. Cl.
CPC ............. B26D 7/1863 (2013.01); B26D 1/14 (2013.01)

(58) Field of Classification Search
CPC .. B23D 59/006; B29G 19/04; B23Q 11/0046; B27B 9/00; B26B 19/44; Y10T 83/207; Y10T 83/976
USPC ...... 83/98, 100, 478, 544, 574; 30/124, 377, 30/392, 125, 391, 390, 388, 264, 295, 30/133, 201, 206, 207, 208; 451/359, 451/342, 454; 144/252.1
See application file for complete search history.

(56) References Cited

U.S. PATENT DOCUMENTS

| | | | | |
|---|---|---|---|---|
| 3,456,696 A | * | 7/1969 | De ........................... | B27B 9/00 310/239 |
| 3,979,825 A | * | 9/1976 | Baumann ................. | B26B 19/20 30/201 |
| 4,150,483 A | * | 4/1979 | Kanazawa .............. | B26B 19/44 30/201 |
| 4,421,111 A | * | 12/1983 | Rothman ................ | A61F 15/02 30/124 |
| 4,672,902 A | * | 6/1987 | Michaels ............... | D05B 65/06 83/100 |
| 5,031,364 A | * | 7/1991 | Belanger ................ | B23D 45/16 451/342 |
| 5,588,213 A | * | 12/1996 | Swanberg ............ | B23D 59/006 30/377 |
| 5,791,979 A | * | 8/1998 | Duncan ................. | B24B 23/028 451/359 |

(Continued)

FOREIGN PATENT DOCUMENTS

TV   I671237 B   9/2019

Primary Examiner — Ghassem Alie
(74) Attorney, Agent, or Firm — Muncy, Geissler, Olds & Lowe, P.C.

(57) ABSTRACT

An edge trimming mechanism of an edge banding machine capable of removing scraps includes a cutting device and an air guiding cover. The cutting device includes a motor having a power outputting shaft, and a cutter mounted at an end of the power outputting shaft. The air guiding cover is hollow-shaped, installed outside the motor, and has air inlet and outlet. The power outputting shaft protrudes out of the air inlet and the cutter is at least partially located out of the air inlet. An air exhausting path is defined between the inner wall of the air guiding cover and the outer wall of the motor. Two opposite ends of the air exhausting path communicate with the air inlet and outlet respectively. By the above-described configuration of the edge trimming mechanism, it is effective in removing the scraps produced by the edge banding machine in the edge trimming process.

3 Claims, 8 Drawing Sheets (56) References Cited

U.S. PATENT DOCUMENTS

| | | | | |
|---|---|---|---|---|
| 8,177,606 | B2 * | 5/2012 | Loveless | ............... B24B 55/052 451/454 |
| 2003/0188803 | A1 * | 10/2003 | Liao | ......................... B27C 1/14 144/252.1 |
| 2011/0162501 | A1 * | 7/2011 | Koegel | ............... B23D 59/006 83/100 |

* cited by examiner

EDGE TRIMMING MECHANISM OF EDGE BANDING MACHINE CAPABLE OF REMOVING SCRAPS AND EDGE BANDING MACHINE

BACKGROUND OF THE INVENTION

1. Field of the Invention

The present invention relates to an edge trimming mechanism of an edge banding machine and more particularly, to an improved edge trimming mechanism of an edge banding machine, which can remove the scraps produced in the edge trimming process.

2. Description of the Related Art

Figure 1:
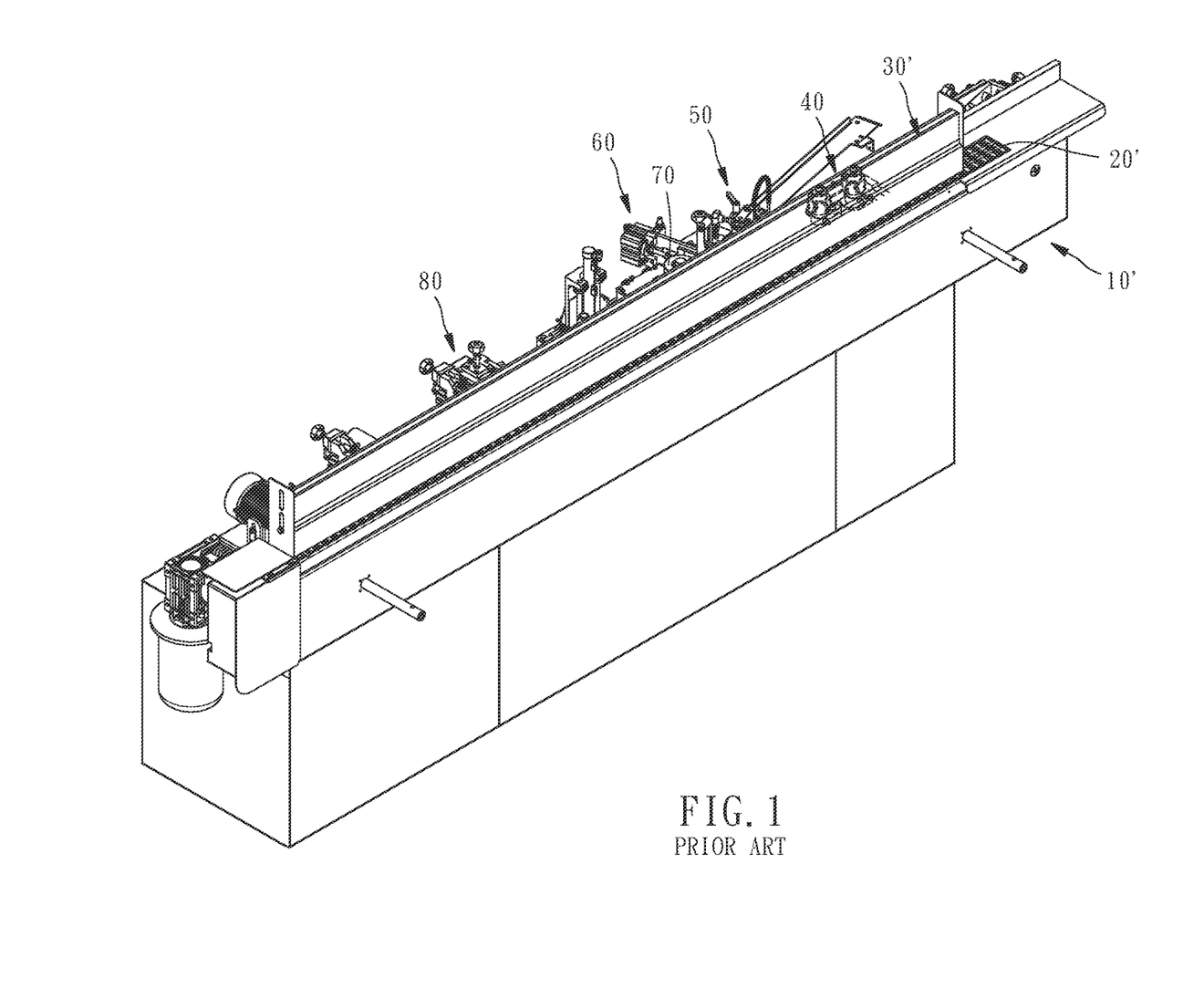
FIG. 1 is a perspective view of a conventional edge banding machine.

For the traditional edge banding machine, Taiwan Patent No. 1671237 can be referred to, which is applied by the applicant of the present invention. Referring to FIG. 1, an edge banding machine is illustrated, which includes a base 10', a set of slideway 20', a positioning pressing wheel set 30' and a plurality of mechanisms including a pre-milling mechanism 40, a glue applying mechanism 50, an edge band conveying mechanism 60, a horizontal pressing wheel set 70 and a bottom trimming mechanism 80. The slideway 20' is movably disposed on the base 10'. The positioning pressing wheel set 30' is disposed above the slideway 20'. The workpiece is clipped between the slideway 20' and the positioning pressing wheel set 30'. The pre-milling mechanism 40 performs a preliminary processing to the surface of the workpiece. The glue applying mechanism 50 applies glue to the surface of the workpiece. The edge band conveying mechanism 60 is adapted to convey an edge band to the workpiece applied with the glue. Then, the edge banding machine cuts off the edge band by a cutter (not shown) and tightly presses the cut-off edge band to the workpiece by the horizontal pressing wheel set 70 to combine the cut-off edge band with the workpiece tightly. At last, the edge banding machine trims edges of the edge band by an edge trimming mechanism which usually includes a top trimming mechanism (not shown) and the bottom trimming mechanism 80, so as to trim off the superfluous part of the cut-off edge band and possibly chamfer the edges of the edge band.

However, the scraps of the edge band produced in the edge trimming process will scatter over the inside of the edge banding machine. The scraps are possible to attach to the surface of the workpiece, resulting in that the operator has to clean the surface of the workpiece. On the other hand, if lots of scraps are accumulated inside the edge banding machine, the scraps are also possible to affect each mechanism located inside the edge banding machine. It can be seen that the design of the conventional edge trimming mechanism of the edge banding machine is not faultless and thereby still needs improvement.

SUMMARY OF THE INVENTION

The present invention has been accomplished in view of the above-noted circumstances. It is one of the objectives of the present invention to make an improvement for the deficiencies of the conventional edge trimming mechanism of the edge banding machine, so as to provide a new edge trimming mechanism of an edge banding machine, which can effectively remove the scraps produced in the edge trimming process.

Therefore, the present invention provides an edge trimming mechanism of an edge banding machine capable of removing scraps, which includes a cutting device and an air guiding cover. The aforementioned cutting device includes a motor and a cutter. The motor has a power outputting shaft. The cutter is mounted at an end of the power outputting shaft. The aforementioned air guiding cover is hollow-shaped and installed outside the motor. The air guiding cover has an air inlet and an air outlet. The power outputting shaft protrudes out of the air inlet and the cutter is at least partially located out of the air inlet. An air exhausting path is defined between the inner wall of the air guiding cover and the outer wall of the motor. Two opposite ends of the air exhausting path communicate with the air inlet and the air outlet respectively.

As a result, under the operation of a dust collecting device for example, the scraps of the edge band produced during the edge trimming mechanism performs the edge trimming process can be discharged out of the edge banding machine through the air inlet along the air exhausting path and the air outlet, so that the scraps of the edge band will not attach to the surface of the workpiece and the scraps of the edge band will not be accumulated inside the edge banding machine.

In an aspect, the edge trimming mechanism is a top trimming mechanism of the edge banding machine, but the present invention is unlimited thereto. The edge trimming mechanism may be a bottom trimming mechanism of the edge banding machine.

In another aspect, the air guiding cover includes a first shell and a second shell. The aforementioned first shell and second shell are installed on top and bottom sides of the motor respectively. The air outlet is located at the first shell. By the configuration of the first shell and second shell, it is convenient to install the air guiding cover on the motor.

Besides, the present invention also provides an edge banding machine which uses the aforementioned edge trimming mechanism and structurally includes a frame body and a moving mechanism. The moving mechanism is mounted to the frame body and connected with the edge trimming mechanism, so as to horizontally or vertically move the edge trimming mechanism to perform the edge trimming process to the edges of the edge band located at different positions.

In an aspect, for realizing the movement of the edge trimming mechanism in different directions, the aforementioned frame body of the edge banding machine includes a first supporting frame, a second supporting frame and at least one guiding rod. Two ends of the at least one guiding rod are connected with the first supporting frame and the second supporting frame respectively. Besides, the moving mechanism includes a horizontal pneumatic cylinder. The horizontal pneumatic cylinder is mounted to the frame body and has a horizontal telescopic rod. An end of the horizontal telescopic rod is connected with the edge trimming mechanism.

In another aspect, the moving mechanism includes a motor mount and a bottom seat. The aforementioned edge trimming mechanism is mounted to motor mount. The motor mount is disposed on the bottom seat capably of moving vertically. The bottom seat is provided with a horizontal slider. The horizontal slider is slidably disposed on the at least one guiding rod.

In another aspect, for realizing the vertical movement of the edge trimming mechanism, the motor mount is provided with a vertical slideway, and the bottom seat is provided with a vertical slider. The aforementioned vertical slider is slidably disposed on the vertical slideway. The moving mechanism has a vertical pneumatic cylinder. The vertical pneumatic cylinder is mounted to the bottom seat and has a vertical telescopic rod. An end of the vertical telescopic rod is connected with the motor mount.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

The technique and features of the present invention will be detailedly specified in the instanced embodiment given herein below and the accompanying drawings. The directional terms mentioned in this specification, such as 'above', 'below', 'inner', 'outer', 'top' and 'bottom', are just for illustrative description on the basis of normal usage direction, not intended to limit the claimed scope.

For the detailed description of the technical features of the present invention, an illustrative embodiment and the accompanying drawings are given herein below.

The embodiment illustrates an edge banding machine 1 capable of removing scraps, which structurally includes a frame body 20, an edge trimming mechanism 10 and a moving mechanism 30.

Figure 2:
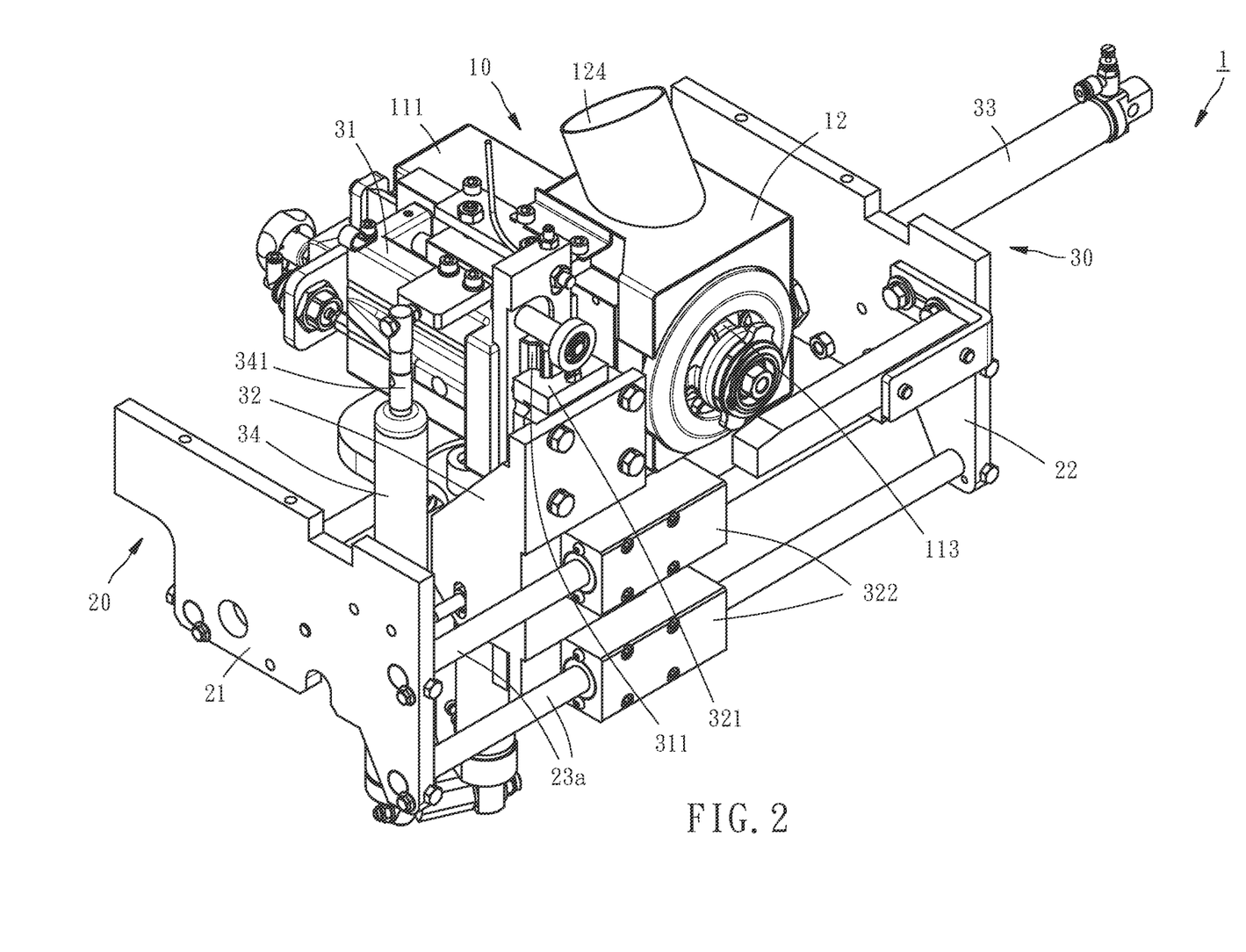
FIG. 2 is a partial perspective view of an edge banding machine of an embodiment.
Figure 3:
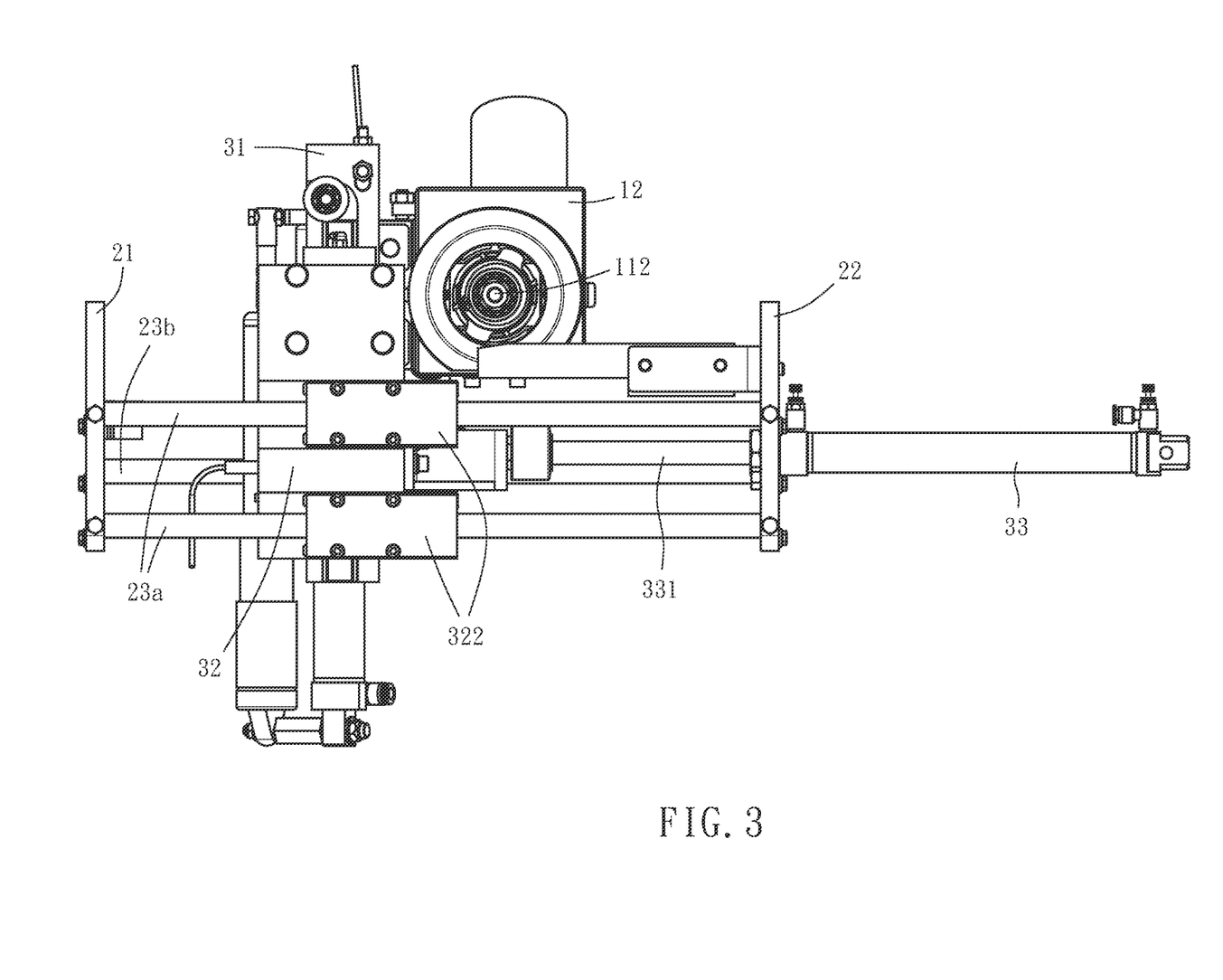
FIG. 3 is a front view of FIG. 2.
Figure 4:
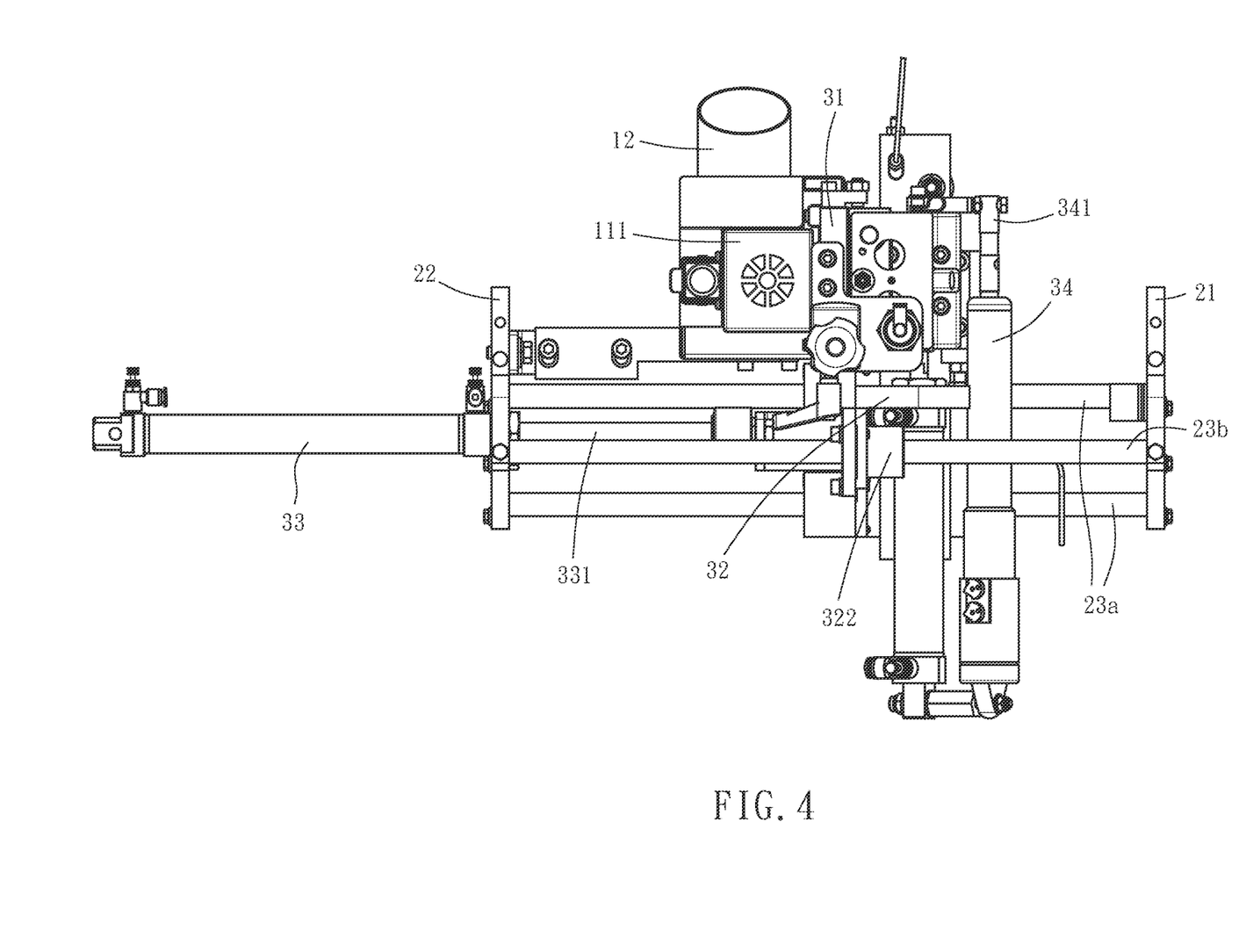
FIG. 4 is a rear view of FIG. 2.

Referring to FIG. 2 to FIG. 4, the frame body 20 is adapted for the installation of each mechanism of the edge banding machine 1, such as each mechanism mentioned in Taiwan Patent No. 1671237. The frame body 20 structurally includes a first supporting frame 21, a second supporting frame 22 and three guiding rods including two front guiding rods 23a and a rear guiding rod 23b. The first supporting frame 21 and the second supporting frame 22 are arranged parallel to each other. The aforementioned three guiding rods 23a and 23b are all connected between the first supporting frame 21 and the second supporting frame 22.

Figure 5:
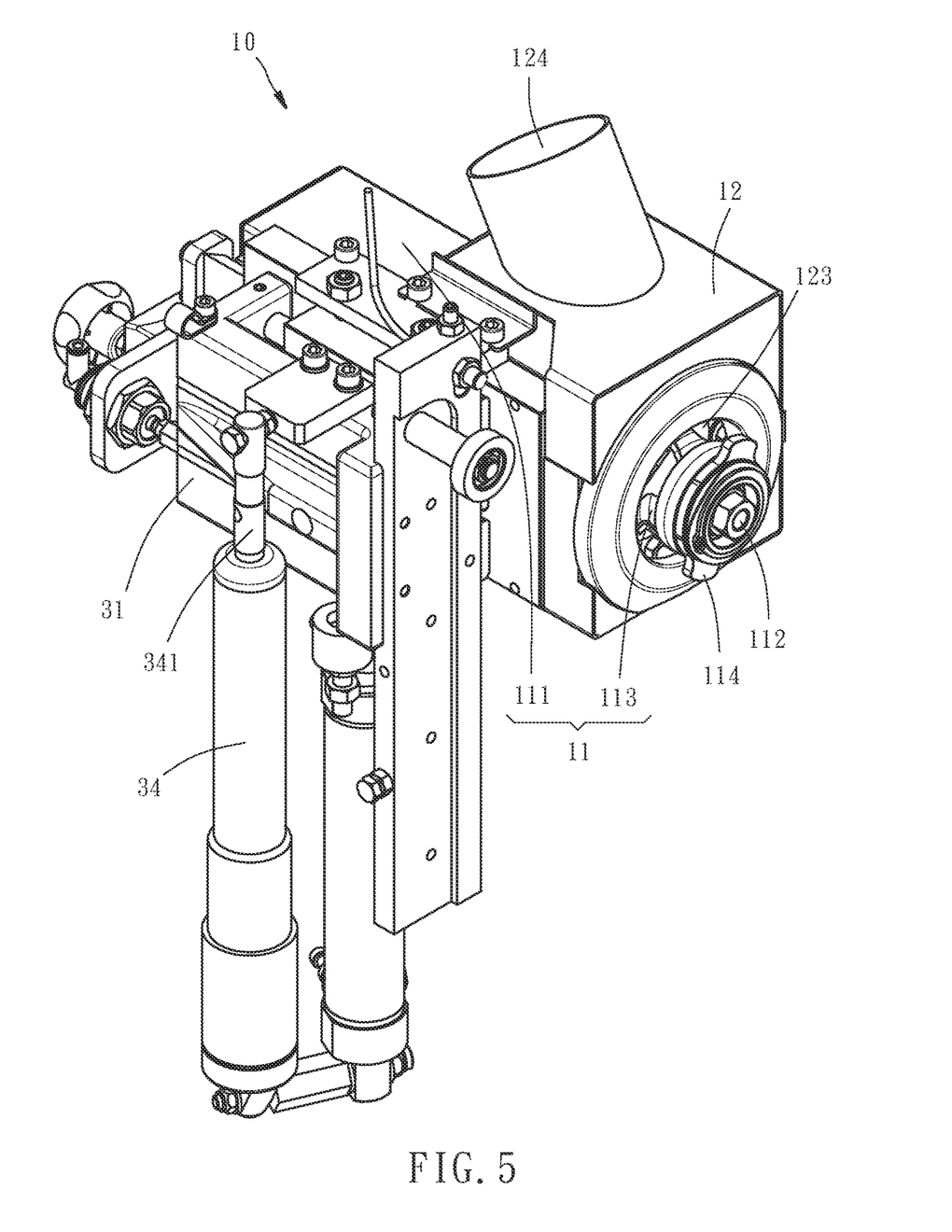
FIG. 5 is similar to FIG. 2, but omits showing supporting frames and guiding rods of the edge banding machine.
Figure 6:
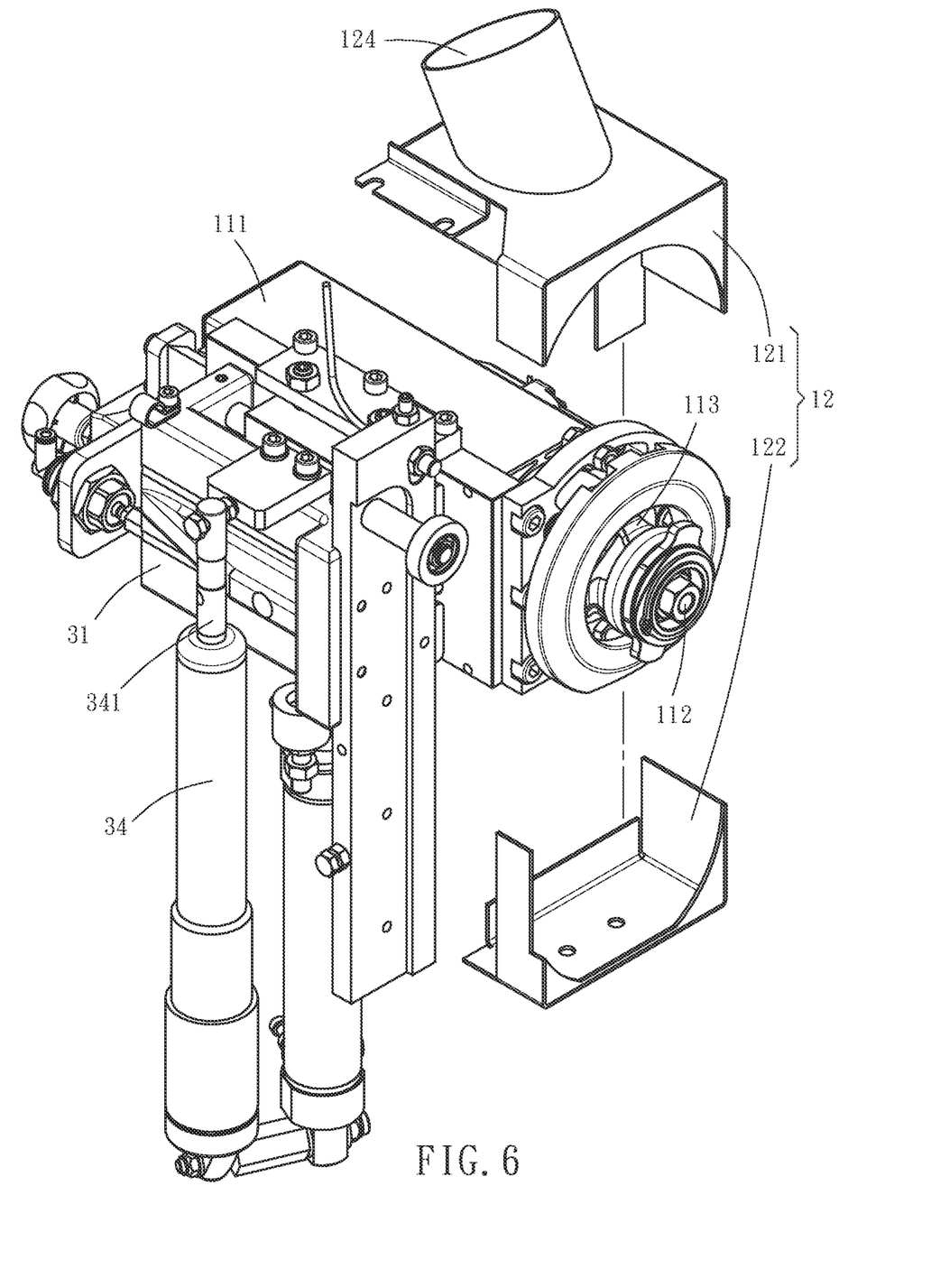
FIG. 6 is a partially exploded view of FIG. 5.
Figure 7:
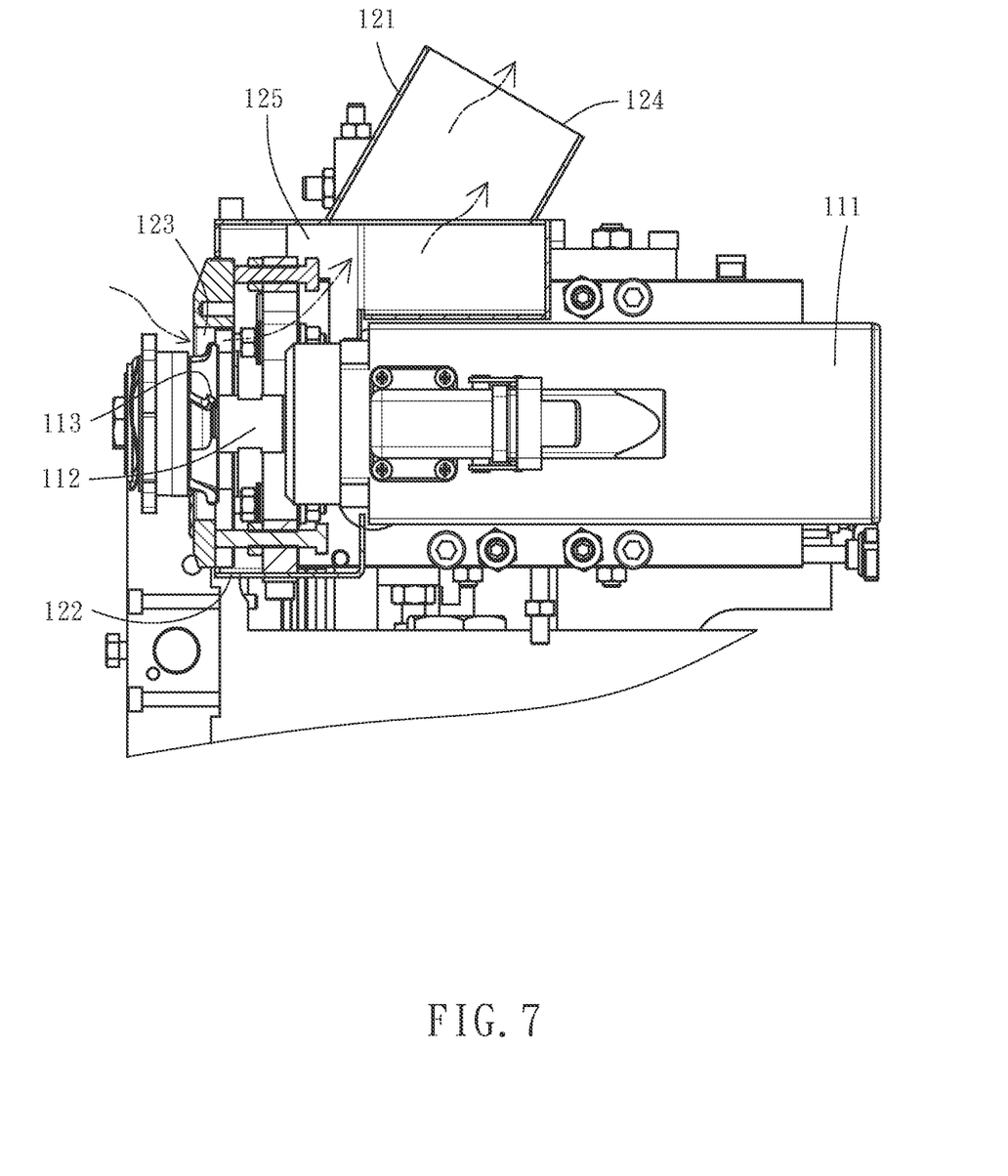
FIG. 7 is a sectional view of FIG. 5.
Figure 8:
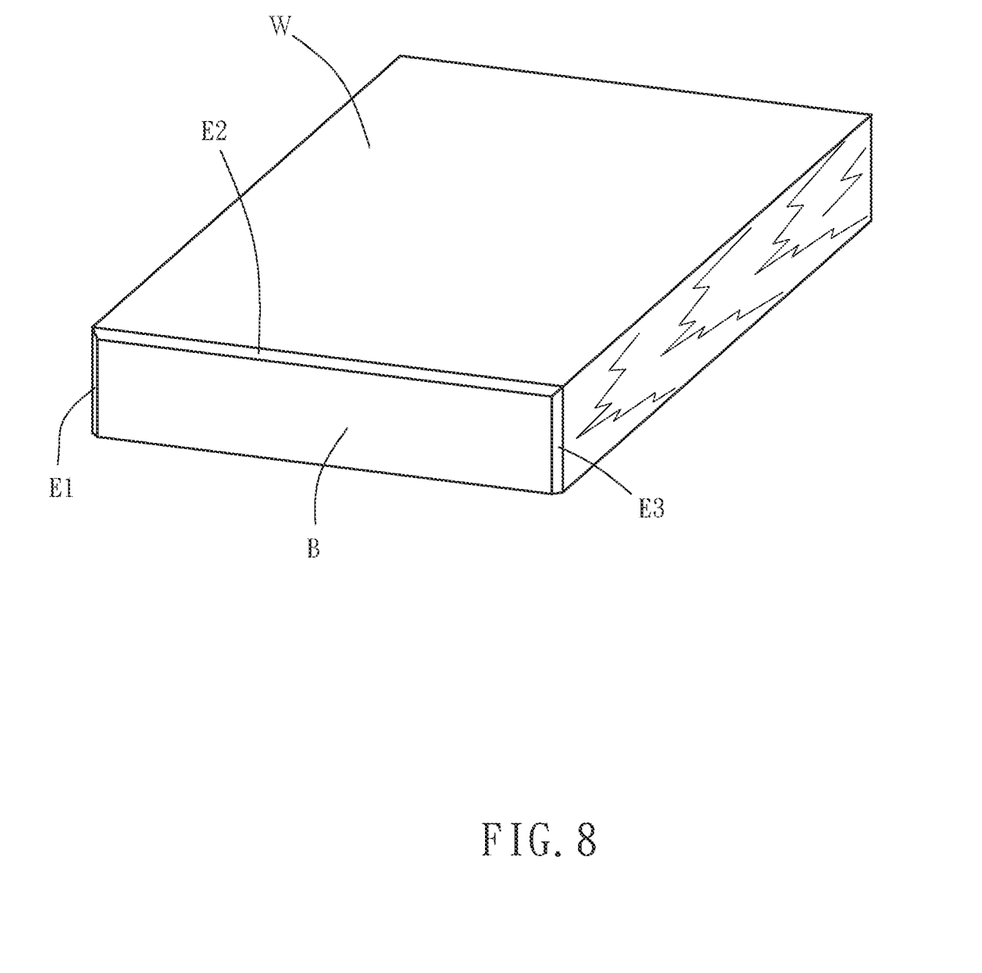
FIG. 8 is a perspective view of a workpiece and its edge band.

Referring to FIG. 5 to FIG. 7, the edge trimming mechanism 10 in this embodiment is a top trimming mechanism, which is adapted to trim edges of an edge band B of a workpiece W, including a left edge E1, a top edge E2 and a right edge E3 as shown in FIG. 8, so as to trim off the superfluous part of the edge band B and chamfer the edges of the edge band B. The edge trimming mechanism 10 structurally includes a cutting device 11 and an air guiding cover 12. The cutting device 11 includes a motor 111, a cutter 113 and a profile wheel 114. The motor 111 has a power outputting shaft 112. The cutter 113 and the profile wheel 114 are mounted to the power outputting shaft 112. The cutter 113 is adapted for performing the edge trimming process to the edges of the edge band B. The profile wheel 114 is adapted for being abutted on the edge of the workpiece W in the edge trimming process. The air guiding cover 12 is hollow-shaped and installed on the outside of the front side of the motor 111. The air guiding cover 12 includes a first shell 121 and a second shell 122. The first shell 121 and the second shell 122 are installed on the top and bottom sides of the motor 111 respectively. The air guiding cover 12 includes an air inlet 123, an air outlet 124 and an air exhausting path 125. The air inlet 123 is located on the front side of the air guiding cover 12. The power outputting shaft 112 of the motor 111 protrudes out of the air inlet 123 of the air guiding cover 12, and the cutter 113 mounted on the power outputting shaft 112 is at least partially located out of the air guiding cover 12. The air outlet 124 is located at the first shell 121 of the air guiding cover 12. An end of the air outlet 124 is connected to a dust collecting device (not shown) located outside the edge banding machine 1. Referring to FIG. 7, an air exhausting path 125 is defined between the inner wall of the air guiding cover 12 and the outer wall of the motor 111, and two opposite ends of the air exhausting path 125 communicate with the air inlet 123 and the air outlet 124 respectively, so that when the dust collecting device is in operation, the dust collecting device can extract the air and scraps located outside the cutting device 11 from the air inlet 123, and the scraps are extracted to the dust collecting device located outside the edge banding machine 1 through the air exhausting path 125 and the air outlet 124 in order.

Referring to FIG. 2 to FIG. 4, the moving mechanism 30 is mounted to the frame body 20 and includes a motor mount 31, a bottom seat 32, a horizontal pneumatic cylinder 33 and a vertical pneumatic cylinder 34. The motor 111 and the air guiding cover 12 of the edge trimming mechanism 10 are both fixed to the motor mount 31 in a screwing manner. The motor mount 31 is provided with a vertical slideway 311. The bottom seat 32 is disposed below the motor mount 31 capably of moving vertically, and the bottom seat 32 is provided with a vertical slider 321 and three horizontal sliders 322. The vertical slider 321 is slidably disposed on the vertical slideway 311, so that the motor mount 31 is movable upward and downward relative to the bottom seat 32 through the combination of the vertical slideway 311 and the vertical slider 321. The bottom seat 32 is provided with three horizontal sliders 322. The aforementioned three horizontal sliders 322 are slidably disposed on the aforementioned three guiding rods 23a and 23b, so that the bottom seat 32 and the motor mount 31 are movable together horizontally along the aforementioned three guiding rods 23a and 23b. The horizontal pneumatic cylinder 33 is mounted to the second supporting frame 22 and has a horizontal telescopic rod 331. An end of the horizontal telescopic rod 331 is connected with the bottom seat 32, which means the end of the horizontal telescopic rod 331 of the horizontal pneumatic cylinder 33 is connected with the edge trimming mechanism 10 through the bottom seat 32 and the motor mount 31 so as to push the bottom seat 32 to move horizontally, thereby driving the motor mount 31 and the cutting device 11 of the edge trimming mechanism 10 to move horizontally to perform the edge trimming process to the top edge E2 of the edge band B. The vertical pneumatic cylinder 34 is mounted to the bottom seat 32 and has a vertical telescopic rod 341. An end of the vertical telescopic rod 341 is connected with the motor mount 31 so as to push the motor mount 31 to move vertically relative to the bottom seat 32, thereby driving the cutting device 11 to move vertically to perform the edge trimming process to the left edge E1 and right edge E3 of the edge band B.

By the above-described configuration design of the edge banding machine 1, after the edge band B is glued to the workpiece W, the edge banding machine 1 can move the cutting device 11 of the edge trimming mechanism 10 vertically and horizontally by the moving mechanism 30, so as to perform the edge trimming process to the left edge E1, top edge E2 and right edge E3 of the edge band B in order. In the edge trimming process, under the function of the dust collecting device and the air guiding cover 12, the scraps of the edge band B produced by the cutter 113 will be quickly discharged into the dust collecting device through the air inlet 123, the air exhausting path 125 and the air outlet 124 of the air guiding cover 12 in order. The scraps of the edge band B are prevented from scattering over the inside of the edge banding machine 1. In this way, the scraps of the edge band B will not attach to the surface of the workpiece W, and the scraps of the edge band B is also prevented from being accumulated inside the edge banding machine 1 to affect the other mechanisms located inside the edge banding machine 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An edge banding machine comprising:
    a frame body;
    an edge trimming mechanism movably mounted to the frame body, the edge trimming mechanism comprising a cutting device and an air guiding cover, the cutting device comprising a motor and a cutter, the motor having a power outputting shaft, the cutter being mounted at an end of the power outputting shaft, the air guiding cover being hollow-shaped and installed outside the motor, the air guiding cover having an air inlet and an air outlet, the power outputting shaft protruding out of the air inlet and the cutter being at least partially located out of the air inlet, an air exhausting path being defined between an inner wall of the air guiding cover and an outer wall of the motor, two opposite ends of the air exhausting path communicating with the air inlet and the air outlet respectively; and
    a moving mechanism mounted to the frame body and connected with the edge trimming mechanism for moving the edge trimming mechanism,
    wherein the frame body comprises a first supporting frame, a second supporting frame and at least one guiding rod; two ends of the at least one guiding rod are connected with the first supporting frame and the second supporting frame respectively; the moving mechanism comprises a horizontal pneumatic cylinder; the horizontal pneumatic cylinder is mounted to the frame body and has a horizontal telescopic rod; an end of the horizontal telescopic rod is connected with the edge trimming mechanism.

2. The edge banding machine as claimed in claim 1, wherein the moving mechanism comprises a motor mount and a bottom seat; the edge trimming mechanism is mounted to the motor mount; the motor mount is disposed on the bottom seat capably of moving vertically; the bottom seat is provided with a horizontal slider; the horizontal slider is slidably disposed on the at least one guiding rod.

3. The edge banding machine as claimed in claim 2, wherein the motor mount is provided with a vertical slideway, and the bottom seat is provided with a vertical slider; the vertical slider is slidably disposed on the vertical slideway; the moving mechanism has a vertical pneumatic cylinder; the vertical pneumatic cylinder is mounted to the bottom seat and has a vertical telescopic rod; an end of the vertical telescopic rod is connected with the motor mount.

* * * * *